United States Patent
Bruun et al.

(10) Patent No.: US 10,664,297 B2
(45) Date of Patent: May 26, 2020

(54) ACTIVATING PRE-CREATED VNFCS WHEN A MONITORED PERFORMANCE LEVEL OF A VNF EXCEEDS A MAXIMUM VALUE ATTAINABLE BY THE COMBINED VNFCS THAT FORM A VNF

(71) Applicant: Hewlett Packard Enterprise Development LP, Houston, TX (US)

(72) Inventors: Peter Michael Bruun, Rungsted Kyst (DK); Thomas Mortensen, Alleroed (DK)

(73) Assignee: Hewlett Packard Enterprise Development LP, Houston, TX (US)

( * ) Notice: Subject to any disclaimer, the term of this patent is extended or adjusted under 35 U.S.C. 154(b) by 237 days.

(21) Appl. No.: 15/110,374

(22) PCT Filed: Feb. 24, 2014

(86) PCT No.: PCT/US2014/018094
§ 371 (c)(1),
(2) Date: Jul. 7, 2016

(87) PCT Pub. No.: WO2015/126430
PCT Pub. Date: Aug. 27, 2015

(65) Prior Publication Data
US 2016/0335111 A1 Nov. 17, 2016

(51) Int. Cl.
*G06F 9/455* (2018.01)
*H04L 12/24* (2006.01)
*H04L 12/26* (2006.01)

(52) U.S. Cl.
CPC ...... *G06F 9/45558* (2013.01); *H04L 41/0896* (2013.01); *H04L 41/50* (2013.01);
(Continued)

(58) Field of Classification Search
CPC ... G06F 2009/45562; G06F 2009/4557; G06F 9/45558; H04L 41/0896; H04L 41/50; H04L 43/0817
See application file for complete search history.

(56) References Cited

U.S. PATENT DOCUMENTS 7,577,722 B1 * 8/2009 Khandekar ......... G06F 9/45558
709/220
8,104,033 B2 1/2012 Chiaramonte et al.
(Continued)

OTHER PUBLICATIONS

Merriam-Webster, Definition of word "idle", retrieved on Dec. 11, 2018.*
All Thin Provisioning is Not Created Equal, (Web Page), May 19, 2008, 4 Pages, searchstorage.techtarget.com/magazineContent/All-thin-provisioning-is-not-created-equal?pageNo=2.
Metzler, J., Virtualization: Benefits. Challenges, and Solutions, (Research Paper), Oct. 24, 2011, 24 Pages.
(Continued)

*Primary Examiner* — Meng Ai T An
*Assistant Examiner* — Jorge A Chu Joy-Davila
(74) *Attorney, Agent, or Firm* — Dicke, Billig & Czaja, PLLC

(57) ABSTRACT

A method of managing virtual network functions for a network, the method including providing a virtual network function (VNF) including a number of virtual network function components (VNFCs) of a number of different types, each VNFC comprising a virtual machine (VM) executing application software. The method further includes creating for up to all VNFC types a number of deactivated VMs having application software, monitoring at least one performance level of the VNF, and scaling-out the VNF by activating a number of deactivated VMs of a number of VNFC types when the at least one performance level reaches a scale-out threshold.

20 Claims, 6 Drawing Sheets

(52) U.S. Cl.
CPC .. *H04L 43/0817* (2013.01); *G06F 2009/4557* (2013.01); *G06F 2009/45562* (2013.01)

(56) References Cited

U.S. PATENT DOCUMENTS

| | | | |
|---|---|---|---|
| 8,738,466 B1* | 5/2014 | Kirby | G06F 17/30864 705/26.5 |
| 9,372,735 B2* | 6/2016 | Calder | G06F 9/5077 |
| 2010/0208619 A1 | 8/2010 | Ho et al. | |
| 2011/0029970 A1* | 2/2011 | Arasaratnam | G06F 9/45558 718/1 |
| 2011/0060820 A1 | 3/2011 | Salkewicz | |
| 2012/0227038 A1* | 9/2012 | Hunt | G06F 9/45558 718/1 |
| 2013/0058228 A1 | 3/2013 | Koponen et al. | |
| 2013/0125124 A1 | 5/2013 | Kempf et al. | |
| 2013/0198319 A1* | 8/2013 | Shen | G06F 9/5077 709/217 |
| 2014/0029764 A1 | 1/2014 | Park et al. | |
| 2015/0082308 A1* | 3/2015 | Kiess | G06F 9/5072 718/1 |

OTHER PUBLICATIONS

New Manageengine Applications Manager Automatically Adjusts Virtual Infrastructure Resources; Ensures Continuous Application Performance, (Web Page), Feb. 22, 2011, 3 Pages, manageengine.com/news/virtual-provisioning-resources.html.

SevOne Extends Network Performance Management Solution with VM and Java Application Monitoring, Sep. 15, 2010, 2 Pages, www.sevone.com/company/news-events/press-releases/sevone-extends-network-performance-management-solution-vm-and-java.

Yue, F., NFV: Virtualization Leads to Dynamic Services, (Research Paper), Oct. 2013, 84 Pages, http://emags.tmcnet.com/emags/2013/it/IT_Oct2013.pdf.

International Searching Authority, "Notification of Transmittal of the International Search Report and the Written Opinion", PCT/US2014/018094, dated Nov. 18, 2014, 10 pages.

Chiosi et al., "Network Functions Virtualisation: An Introduction, Benefits, Enablers, Challenges & Call for Action", ETSI White Paper, Oct. 2012, 12 pages.

\* cited by examiner

US 10,664,297 B2

ACTIVATING PRE-CREATED VNFCS WHEN A MONITORED PERFORMANCE LEVEL OF A VNF EXCEEDS A MAXIMUM VALUE ATTAINABLE BY THE COMBINED VNFCS THAT FORM A VNF

BACKGROUND

Network functions and services have traditionally been provided on dedicated and proprietary hardware appliances. Examples of such network functions, also known as Physical Network Functions, include firewalls, load balancers, Deep Packet Inspectors, and Network Address Translators, to name just a few. Traditionally, physical network functions require physical installation at each site where such functions are needed. "Network Functions Virtualization" is an emerging design approach, particularly in the telecommunications industry, to transform physical network functions into "Virtual Network Functions" by implementing physical network functions as software which can be hosted and run a range of standard hardware, such as blade servers, for example.

DETAILED DESCRIPTION

Figure 1:
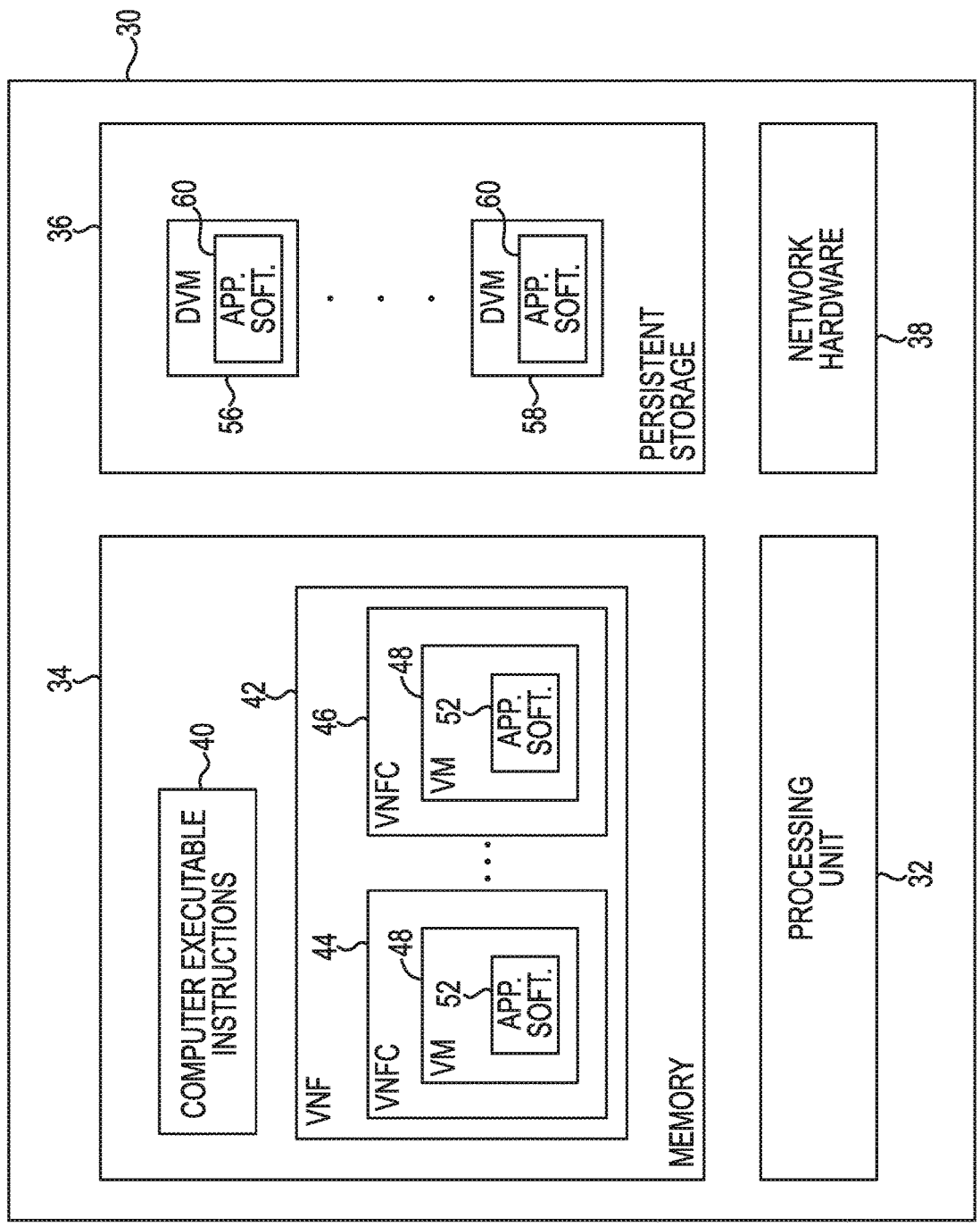
FIG. 1 is a schematic block diagram generally illustrating an example of a virtual network function management system.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Network functions and services, such as firewalls, Load Balancers (LBs), Deep Packet Inspectors (DPIs), and Network Address Translators (NATs), for example, have traditionally been provided as Physical Network Functions (PNFs) on proprietary hardware appliances that typically require physical installation at each site where such PNFs are needed.

Over time, as network services and functions have evolved and expanded, networks have become populated with an ever increasing variety of such proprietary hardware appliances. Increasing the capacity of existing PNFs and launching of new network services often requires adding additional numbers of existing types of hardware appliances to the network or creating and adding entirely new types of hardware appliances to the network. In addition to the provision of the hardware appliances themselves, finding space and providing power/cooling to accommodate such hardware appliances, as well as the increasing complexity of integrating and deploying these appliances in the network is becoming ever more difficult and costly. Furthermore, physical hardware appliances rapidly reach end of life, and hardware lifecycles are becoming shorter as innovation accelerates, thereby requiring increased repetition of the procure-design-integrate-deploy cycle, reducing the return on investment of deploying new services, and constraining innovation in an increasingly network-centric world.

Network Functions Virtualization (NFV) is an emerging design approach, particularly in the telecommunications industry, to transform network functions (NFs) previously performed via proprietary hardware appliances into Virtual Network Functions (VNFs) by implementing the NFs as application software which can be run on a range of standardized, high-volume servers, switches, and storage that can be located in datacenters, network nodes, and in end user premises, for example.

Virtualizing NFs ends the dependency between a NF and its hardware (as is the case with physical hardware appliances) by creating a standardized execution for VNFs. This enables the sharing of physical hardware by multiple VNFs, wherein the pooling of hardware, in-turn, enables the sharing of NFV Infrastructure (NFVI) resources, as is already seen in IT cloud computing infrastructures.

The use of VNFs also avoids the cost and complexities of designing and installing unique hardware appliances for each NF, with each hardware appliance having different power, cooling, and space needs, and also reduces power consumption and cooling costs. As will be described in greater detail below. NFV enables networks to adapt more quickly to rapidly and frequently changing network requirements and services as compared to proprietary hardware appliances, which can take several weeks to months to install when considering the equipment design-build-procure process with vendors, and shipping, installation, and testing times.

Furthermore, as will be described in greater detail below, NFV enables network providers to better allocate and match NF resources to the typically variable capacity requirements of NFs. With proprietary hardware appliances, adequate capacity must be provided to meet expected peak capacity requirements. However, such capacity is typically unused during off-peak times, resulting in expensive license fees being paid to vendors of the proprietary hardware for NF capacity that is often sitting idle.

A VNF may include one or more VNF Components (VNFCs) of one or more types, with each VNFC being realizable by various technologies, including by Virtual Machines (VMs) executing application software. A VM is a software implementation of a machine (i.e. a computer) that executes programs like a physical machine. VMs enable a host computer to run multiple application environments or operating systems simultaneously on the same computer. The host computer allots a certain amount of the host's resources to each VM, and each VM is then able to use the allotted resources to execute application software, including operating systems. A VM virtualizes the underlying hardware of the host computer or emulated hardware devices, making the use of the VM transparent to the operating system or to the user of the application software.

VMs on a host computer are typically managed by application software referred to as a Hypervisor. Among operations that a Hypervisor may perform are operations to create, start, stop, hibernate, activate, deactivate, and delete a VM. To create a VM, a Hypervisor may use an Image File stored on some persistent storage media. The Image File contains an operating system application and other application software that will be started when the Hypervisor creates a VM from the Image File.

The Hypervisor and associated application software may also attach the UM to virtual networks that, in-turn, may be connected to physical networks so that the VM can communicate with other entities, including other VMs inside or outside the Hypervisor and with external physical devices attached to the networks, including devices on the Internet and on radio access networks handling network communications from mobile devices, for example.

VNFs enable the capacity of a network function to be adjusted more quickly than NFs provided by physical hardware appliances According to current NFV techniques, when increased capacity is required for a VNF, a network operator, via a user interface or by automated processes, communicates with and instructs the Hypervisor to create a new VM, or new VMs, with each VM running application software and forming one of the VNFCs of the VNF. The hypervisor then attaches the new VM, or VMs, to the network (e.g. virtual network) to provide the additional capacity to the VNF. The process of increasing the capacity of a network function is typically referred to as "scale-out".

According to such current techniques, rather than taking several weeks to months to provide scale-out of a network function, as is required for scale-out of proprietary hardware appliances providing PNFs, scale-out of a VNF via creation of one or more new VMs can take as little as for example 20 minutes. While scale-out times for VNFs marks a substantial improvement relative to that achievable for NFs provided by proprietary hardware appliances, faster scale-outs are desirable, particularly for telecommunications networks which can experience rapid fluctuations in user activity volume and which are continuously being modified and upgraded to improve existing and to provide new services that create new or altered activity patterns.

As will be described in greater detail below, examples for managing VNFs in accordance with the present disclosure reduce scale-out times of VNFs by a significant factor relative to current techniques. A VNF includes a number of VNFCs of a number of different types. For some of these types, each VNFC is formed by a VM executing application software. In one example, a VNF includes a number of layers, with each VNFC type corresponding to a different one of the layers, with each layer, and thus each VNFC, providing a different role or function of the overall functionality of the VNF. When a VNF comprises more than one VM-based VNFC, the VMs are configured by a VNF management software component (which will be described in greater detail below) which communicates with the VMs, such as via networks (e.g. physical and virtual networks) so that the VMs work together to provide the functionality of the VNF.

According to one example, a number of VMs loaded with application software are pre-created for one or more of the different VNFC types. The pre-created VMs are deactivated, such as by beings stopped or hibernated, for example, and their states are placed in persistent storage. According to one example, the deactivated VMs form a resource pool, or pools, of pre-created, deactivated VMs.

According to one example, at least one performance level of the VNF is monitored (i.e. measured). The monitored performance levels can be one of a number of parameters or indicators which are relevant to the purpose of the VNF, and can be of an overall performance level of the VNF, a performance level of a VNF layer (i.e. a performance level of all VMs of the VNFC type corresponding to the VNF layer, or any combination thereof. The monitored parameters are sometimes referred to as Key Performance Indicators (KPIs). One example of a KPI that can be monitored is a processing rate of the VNF. Examples of other KPIs include the number of simultaneous transactions, connections and/or package throughputs or combinations and functions or predictions thereof (e.g. running averages).

According to one example of the present disclosure, when the at least one performance level of the VNF reaches a scale-out threshold, a number of the pre-created and deactivated VMs of a number of VFNC types are activated to increase the maximum performance capacity of the VNF and thereby scale-out the VNF. In one example, more than one VM, each providing a different VNFC of the VNF may be activated to increase capacity of the VNF.

The maximum achievable performance level of a given KPI for a VNF depends on, among other factors, the number of VMs of some or all of the VNFC types that together form the VNF. According to one example, the scale-out thresholds, as well as scale-in thresholds, are based on the maximum achievable performance level of the VNF which is being monitored and, as a result, can change when a VNF is scaled-out or scaled-in. For example, a given instantiation of a VNF onto physical and virtualized infrastructure will have a maximum processing rate determined by, among other things, the number of VMs of some or all of the VNFC types working together to form the VNF.

In one example, the monitored performance level may be of a number of KPIs of the overall performance of the VNF, and an algorithm is employed to determine whether a threshold level has been crossed and what number of VMs of which VNFC types should be activated to scale-out the VNF. In another example, the monitored performance level may be of a VNF layer and one or more VMs of the VNFC type of the VNF layer are activated to scale-out performance of the VNF layer and, thus, the performance of the VNF.

Creating and starting a VM are time consuming operations for a hypervisor and the hardware on which the VM executes. Stopping an activated VM is equivalent to a shutting down and powering-off of a physical machine. When turned-on (i.e. activated), the VM goes through an automated boot sequence of starting the operating system and application software. This is known as a "clean boot". Hibernating an activated VM (or physical machine) also involves turning-off the VM, but in a way that the full run-time memory image of the VM is saved to one or more Hibernation Files on persistent storage. When re-starting the hibernated VM (i.e. activating), the run-time image is restored such that the VM continues from the same running state as prior to being hibernated without having to go through a boot sequence.

With regard to a hibernated VM, saving and restoring the run-time image takes time and uses persistent storage capacity. While the boot-sequence for starting a stopped VM typically takes longer than restoring the run-time image of a hibernated VM, in some instances, stopping and restarting a VM may be advantageous to hibernating and restarting a hibernated VM. For example, in some instances, a run-time image of a hibernated machine may require too much storage space, or the boot sequence for a particular VM might nearly as fast or faster than restoring the run-time image of a hibernated VM. Regardless, creating and starting a VM on-demand requires substantially more time than activating either a stopped or hibernated VM.

According to examples of the present disclosure, performing scale-out of a VNF by activating a number of deactivated VMs, either stopped or hibernated, from a pool of deactivated VMs each having application software for a one or more VNFC types substantially reduces VNF scale-out times as compared to current VNF scale-out techniques which create and start VMs on demand. According to some examples, scale-out times using a pool, or pools, of pre-created and deactivated VMs, according to examples described herein, are 15-20 times faster than scale-out times of current techniques creating VMs on demand.

FIG. 1 is a schematic block diagram of a VNF management system 30 according to one example of the present disclosure. VNF management system 30 can include various systems and subsystems, and can be a personal computer, a laptop computer, a workstation, a computer systems, an application specific integrated circuit (ASIC), a server, a server blade center (data center), and a server farm, among others, for example. VNF management system 30 includes a processing unit 32, including at least one processing core, a memory 34, persistent storage 36, and network hardware 38. Memory 34 stores machine executable instructions and can be implemented as a computer-readable medium, such as, for example, random access memory. Persistent storage 36 can be any storage that is maintained independently of any process running on processing unit 32, such as disk storage, for example.

VNF management system 30 includes computer executable instructions 40 which are accessed and executed by processing unit 30, with computer executable instructions 40 providing instructions to provide a VNF, such as VNF 42, including a number (the number including the number "1") of VNFCs of a number (the number including the number "1") of different types, such as VNFCs 44 and 46, with each VNFC comprising a VM executing application software, such as VMs 48 and 50 executing application software 52 and 54.

Computer executable instructions 40 further provide instructions for creating for up to all VNFC types a number (including the number "1") of deactivated VMs (DVMs) having application software, such as DVMs 56 and 58 having application software 60 and 62. When executed by processing unit 30, computer executable instructions 40 further provide instructions for monitoring at least one performance level of a VNF, such as VNF 42, and for scaling-out the VNF by activating a number of DVMs of a number of VNFC types, such as DVMs 56 and 58 when the at least one performance level reaches a scale-out threshold. Although not illustrated as such, in other examples, computer executable instructions 40 may be executed by a VM.

Figure 2:
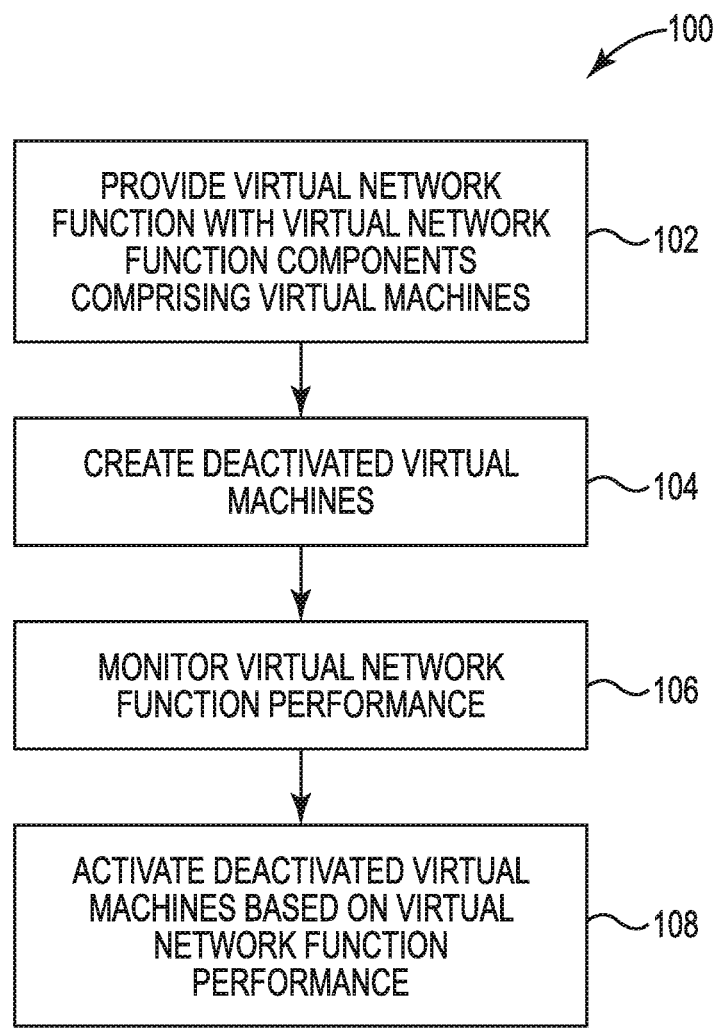
FIG. 2 is a flow diagram illustrating an example of a method of managing virtual network functions with deactivated virtual machines.

FIG. 2 is a flow diagram illustrating an example of a method 100 of managing virtual network functions using pre-created and deactivated VMs according the present disclosure. Method 100 begins at 102 with providing a VNF including a number of VNFCs of a number of VNFC types, each VNFC formed by a VM executing application software. At 104, a number of deactivated VMS having application software are created for up to all of the VNFC types. At 106, at least one performance level of the VNF is monitored. At 108, when the at least one parameter reaches a scale-out threshold level, a number of deactivated VMs of a number of VNFC types are activated to scale-out the VNF.

Figure 3:
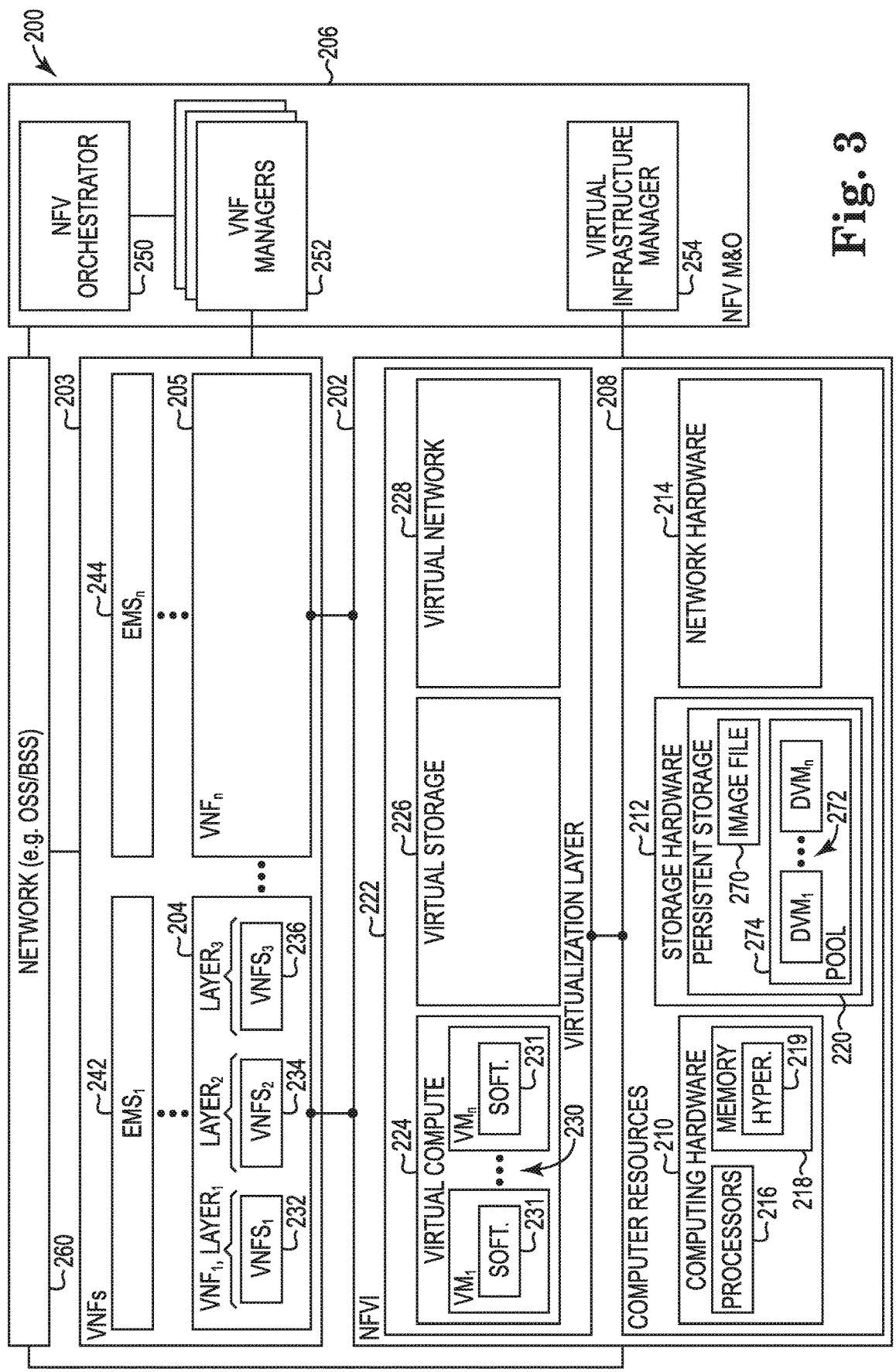
FIG. 3 is a schematic block diagram illustrating an example of a network system architecture in which examples of the present disclosure can be implemented.

FIG. 3 is schematic block diagram illustrating an example NFV Architectural Framework 200 in which examples of managing virtual network functions with hibernated virtual machines in accordance with the present disclosure can be implemented. The main architectural constituents of NFV Architectural Framework include a Network Functions Virtualization Infrastructure (NFVI) 202, a number of Virtualized Network Functions (VNF) 203, illustrated as $VNF_1$ to $VNF_n$ at 204 and 205, and NFV Management and Orchestration function (NFV M&O) 206. It is noted that NFV Architectural Framework 200 of FIG. 3 is based on an NFV architectural framework developed and described by the Network Functions Virtualization Industry Specification Group (NFV ISG) of the European Telecommunications Standards Institute (ETSI).

NFVI 202 provides the virtual resources required to support the execution of VNFs, and includes commercial, off-the-shelf computer resources 208. Computer resources 208 include computing hardware 210, storage hardware 212, and network hardware 214, with computing hardware 210 including processors 216 and memory 218, and storage hardware 212 including persistent storage 220. In one example, a hypervisor 219 resides on computing hardware 210 and manages VMs on the host computing system 210. Persistent storage is defined as storage that is maintained independent of any process that is running on a processor, such as disk storage, for example. Hardware resources can comprise standardized, high-volume hardware, such as blade servers, for example, and can be disposed at any physical location on the network, such as in any number of data centers or other operational facilities that can geographically dispersed from another, including globally.

NFVI 202 further includes a virtualization layer 222 which comprises a software layer that virtualizes and abstracts the underlying computer resources 208, and includes a virtual computing component 224, a virtual storage component 226, and a virtual network component 228. Virtual computing component 224 includes a number of VMs, indicated as $VM_1$ through $VM_n$ at 230, wherein individual VMs of $VM_1$ through $VM_n$ can be of different types.

VNF 203 represents the software implementation of a number of network functions, illustrated as $VNF_1$ to $VNF_n$ at 204 and 205, which are capable of running over NFVI 202. $VNF_1$, at 204, includes a number of virtual network function components (VNFCs), illustrated as $VNFC_1$ at 232, $VNFC_2$ at 234, and $VNFC_3$ at 236, with each VNFC comprising a VM executing application software, such as such as application software 231 being executed by one of VMs $VM_1$ to $VM_n$ at 230, wherein each VM 230 executing application software 231 forms a different VNFC. In one example, $VNFC_1$, $VNFC_2$, and $VNFC_3$ are each of a different VNFC type, with each VNFC type providing different functionality to VNF 204. In one example, a VNF, such as VNF 204, includes a number of layers, such as $Layer_1$, $Layer_2$, and $Layer_3$, with each layer providing different functionality of VNF 204 and each layer including all VNFCs of a same type. Although illustrated with respect to VNF 204, all VNFs can be structured in a similar fashion and include different numbers of VMs, VMFCs, and layers.

Each VNF can be accompanied by an Element Management System, such as element management systems $EMS_1$ at 242 and $EMS_n$ at 244. The element management systems, EMSs, are typically provided with the corresponding VNF, such as by the VNF vendor, such that each EMS is configured to the particularities of the corresponding VNF and provides monitoring and management of each VNF. VNF 204 is an entity corresponding to a physical network node, but as opposed to hardware appliances, provides the node as software free from hardware dependency.

NFV M&O 206 comprises software applications, including NFV Orchestrator 250, VNF Managers 252, and virtual infrastructure manager (VIM) 254, which cover orchestration and management of physical and/or software resources that support the infrastructure virtualization and management of the VNFs. NFV M&O 206 performs virtualization-specific management tasks in NFV architecture framework 200, and interacts with the external landscape, such as the OSS/BSS landscape 260, which enables NFV to be integrated into an existing network-wide management landscape.

In one example, NFV Orchestrator 250, among other functions, can commission and decommission VNFs and invoke decisions, either manually or automatically, as to when to scale-out or scale-in a VNF, such as VNF 204. NFV Orchestrator 250 may also, either directly or indirectly through one or more other systems (e.g. VIM 254) direct Hypervisor 219 to create, delete, start, stop, hibernate, and activate VMs, such as VMs executing application software and forming VNFCs.

Additionally, NFV Orchestrator 250 may include or be deployed with one or more performance monitoring systems (e.g. including, but not limited to VNF managers 252, and EMSs 242, 244, and 246) which are able to monitor configured policies and thresholds for VNF KPIs. NFV Orchestrator 250 uses the results of such measurements to make a determination as to when a VNF is about to reach its maximum performance rates or when it is under-utilizing a current maximum performance rate, and based on such a determination makes a decision as to whether to scale-out or scale-in the VNF.

Furthermore, while illustrated in FIG. 3 as being associated with a single NFVI 202, NFV Orchestrator 250, in other examples, can communicate and interact with Hypervisors, VIMS, VNF managers, and other monitoring systems in other systems in one or more geographical locations and with networks connecting these systems such that VNFs can be scaled-out or scaled-in differently in each location in response to differing performance rate requirements and KPI measurements in the different geographic locations.

An example of managing virtual network functions with deactivated virtual machines, such as stopped and/or hibernated VMs, in accordance with the present disclosure, is described below with reference to FIG. 3. According to the illustrated example, VNF 204 comprises three VNFCs, illustrated as $VNFC_1$, $VNFC_2$, and $VNFC_3$, with each VNFC being of a different VNFC type and being of a different VNF layer, and with each formed as a different VM executing application software, such as one of the VMs illustrated as $VM_1$ through $VM_n$ at 230 executing application software 231. In one example, each of the three VNFCs, $VNFC_1$, $VNFC_2$, and $VNFC_3$, are executed by a different UM type.

A VNF manager which is specific to VNF 204 and understands unique requirements and performance requirements of VNF 202, such as VNF Manager 252, configures the VMs of VNFCs $VNFC_1$, $VNFC_2$, and $VNFC_3$ so as to work together to provide VNF 202 by communicating via networks to which the VMs are attached. In one example, VNF 204 may be a firewall, for example, but VNF 204 could also be any network function such as a DPI, an NAT, or an LB, for example.

A VIM, such as VIM 254, is application software that tracks and manages all VMs hosted on a given set of hardware resources (e.g. a given blade-type server at a particular location, such as data center, for instance), such as all active VMs 230 and deactivated VMs hosted on. The VIM tracks the state of VMs on the given set of hardware resources (e.g. active, stopped, and hibernated), hardware resources assigned to each VM, and hardware resources available, among other information.

In one example, NFV Orchestrator 250, via VIM 284, directs hypervisor 219 to create a number of VMs for a number of VNFCs of VNF 204, and to load application software onto each VM such that, when executed by the VM, the VM forms the corresponding VNFC. In one example, NFV Orchestrator 250 directs Hypervisor 219 to create a number of deactivated VMs for each VNFC type of VNF 204. In one example, the application software includes an operating system application. In one example, as described above. Hypervisor 219 uses an Image file stored on a persistent storage, such as Image File 270 stored on persistent storage 220, where the Image File contains the application software that will be started whenever Hypervisor 219 creates a VM from the Image File, with different image files being employed for creating different VMs.

In one example, after the VMs created for each VNFC type are configured for connection to the network, the VMs are deactivated by stopping or hibernating the created VMs. According to one example, the deactivated VMs are stored, such as on a persistent storage, so as to form a resource pool of deactivated VMs for the VNF, such as Deactivated Virtual Machines (DVMs) 272, illustrated as $DVM_1$ to $DVM_n$ stored in persistent storage 220 to form resource pool 274 of DVMs for VNF 204. In one example, resource pool 274 has a desired capacity level for deactivated VMs of each VNFC type of the VNF, such as for VNFC types $VNFC_1$ to $VNFC_3$ of VNF 204. According to one example, the VM capacity level can be different for each VNFC type.

In one example, $EMS_1$ measures a number of desired KPIs of VNF 204, and provides the measured KPIs to a VNF manager, such as VNF manager 252. In one example, $EMS_1$ measures KPIs of each VM of VNF 204. In one example, EMS1 measure KPIs of each VNFC type or layer of VNF 204.

VNF Manager 252 tracks all VMs, VNFCs, layers, and functions of a particular VNF, such as VNF 204, and is typically provided by the vendor providing the VNF and, thus, knows the particular traits, operating requirements, and peculiarities of the corresponding VNF. VNF manager 252 further knows the performance capabilities of each VM of the VNF, the current maximum performance levels for the VNF based on the VMs currently employed by the VNF, and a scale-out threshold for each monitored performance level of the VNF. Based on the measured KPIs received from $EMS_1$, as well as from other sources (e.g. VIM 254), VNF Manager 252 determines whether a scale-out threshold has been reached and whether a number of deactivated VMs of a number of VNFC types should be scaled-out to improve performance of the VNF, such as VNF 204.

According to one example, VNF Manager 252 monitors a performance level of each VNFC type of the VNF, such as VNFC types $VNFC_1$ to $VNFC_3$ of VNF 204 (i.e. layers of VNF 204) and determines whether to scale-out a VNFC type or layer based on an overall performance level of the VNFC type. In one example, based on various KPIs, VNF Manager 252 monitors an overall performance level of the VNF, and if the performance level reaches a scale-out threshold, based on the vendor's understanding of the VNF's structure, VNF Manager 252 determines which number of VMs of which VNFC types should be scaled out to improve the overall performance of the VNF.

As an example, based on a monitored performance level reaching a scale-out threshold, VNF Manager 252 determines that a scale-out the VNF, such as VNF 202, is required. VNF Manager 252 determines which type or types of VNFCs, and how many deactivated VMs of the identified VNFC type or types need to be activated from resource pool 274 in order to scale-out VNF 202, and provides the scale-out request to Orchestrator 250.

In contrast to VNF manager 252, which tracks only one corresponding VNF, NFV Orchestrator 250 tracks all VNFs operating on the network, the types of each VNFC and the number of VMs of each VNFC type, the performance of all VNFs, hardware resources assigned to each VNF, and hardware resources which are available for assignment (such as from VIM 254, for example). In one example, based on this information, NFV Orchestrator 250 determines whether the scale-out request from VNF manager 252 is valid and not the result of resource competition from other applications using the same hardware resources (e.g. the scale-out request is the result of a higher priority VNF requiring the available hardware resources), whether there are hardware resources available for scale-out of the VNF, and whether scale-out of the VNF could result in inadequate resources for other VNFs or applications. As such, in some instances, NFV Orchestrator 250 may override a scale-out request by a VNF Manager, such as VNF Manager 252, and delay or cancel a scale-out request if resources are not available for a scale-out, or there is a higher-priority VNF requiring the available resources, for example.

If NFV Orchestrator 250 determines to initiate scale-out of the VNF, such as VNF 202, NFV Orchestrator 250, via VIM 254, instructs Hypervisor 219 to activate the number of deactivated VMs (DVMs) of the number of VNFC types from resource pool 274 to provide the desired scale-out of the VNF, such as VNF 204, as requested by VNF manager 252. For example, if VNF manager 252 requested that one VM of the type executing VNFC be activated in order to increase capacity of VNF 202, Hypervisor 219 activates from resource pool 274 one DVM of the $VNFC_1$ type for VNF 202. The now activated VM of the $VNFC_1$ type is then registered with VNF Manager 252 which, in-turn, notifies other components of the network that the newly activated VM of the $VNFC_1$ type is available to the network.

In one example, upon activation of the VM from the pool 274 of DVMs, NFV Orchestrator 250 also instructs Hypervisor 219 to create and hibernate a new VM of the VNFC type. In this way, the hibernated capacity for each VM type providing each VNFC is replenished before a next scale-out request for such VM type is received.

It is noted that the above-described scale-out process applies to each VM of each VNFC type. It is further noted that the decision by NFV Orchestrator 250 can be manually initiated by a network operator who is notified of the scale-out request and provided with relevant decision making data via a user-interface, or can be an automated decision made by NFV Orchestrator 250, or can be selected as being either automatic or manual by a network operator.

Additionally, it is noted that above-described scale-out process can be similarly applied to provide a scale-in process for a VNF (i.e. the KPI of the VNF has dropped to a scale-in threshold which is indicative of over-capacity for the VNF). However, instead of activating a number of DVMs from resource pool 74 in response to the KPI for the VNF reaching a scale-out threshold, a currently active VM of a VNFC type of the VNF, such as a VM of the $VNFC_1$ type of VNF 202, is disconnected from the network and deactivated. In example, the scale-in threshold is set to be lower than the scale-out threshold to provide hysteresis there between. According to one example, a VNF may be scaled-in by NFV Orchestrator 250 for reasons unrelated to a performance level of the VNF. For example, NFV Orchestrator may scale-in a VNF in order to make capacity available to a higher-priority VNF running on the same computer hardware.

According to one example, after deactivating a VM to scale-in a VNF, the deactivated VM is destroyed if the VM capacity level is at or above the desired VM capacity level. In one example, the deactivated VM is either stopped or hibernated, and placed in resource pool 274 if the VM capacity level is below the desired VM capacity level. In this case, after being deactivated removed from the network, the deactivation is registered with VNF manager 252 which notifies other components of the network that the VM is no longer available to the network. It is noted that the process of deactivating and placing a VM in resource pool 274 can be done more quickly than creating a VM on demand and then deactivating and placing the newly created VM in resource pool 274.

According to one example, if a VM of a VNFC type is in a process of being created by Hypervisor 219 to replace a VM of the VNFC type which was activated from resource pool 274 in order to maintain the VM capacity level of the VNFC type at the desired capacity level, while an active VM of the VNFC type is in a process of being deactivated, the process of creating the VM of the VNFC type is terminated. Alternatively, according to one example, the process of creating the VM of the VNFC type is completed and the newly created VM is either stopped or hibernated and placed in resource pool 274, and the process of deactivating the VM of the VNFC type is completed, and the newly deactivated VM is either stopped or hibernated and also placed in resource pool 274. Any VM of the VNFC types in resource pool 274 is then selected and deleted so as to maintain the VM capacity level at the desired capacity level.

According to one example, if resource pool 274 does not include a VM of a VNFC type which is requested as part of a scale-out of the VNF, such as VNF 204, Hypervisor 219 is instructed to create and activate the required number of VMs of the VNFC type so as to complete the scale-out process of the VNF as quickly as possible, in lieu of first deactivating and placing the newly created number of VMs in resource pool 274.

Although not illustrated as such, it is noted that, according to other examples, NFV Orchestrator 250, VNF Managers 252, VIMs 254, and Hypervisor 219, as well as other components of a VNF management system may also be realized as application software executed by VMs.

Figure 4:
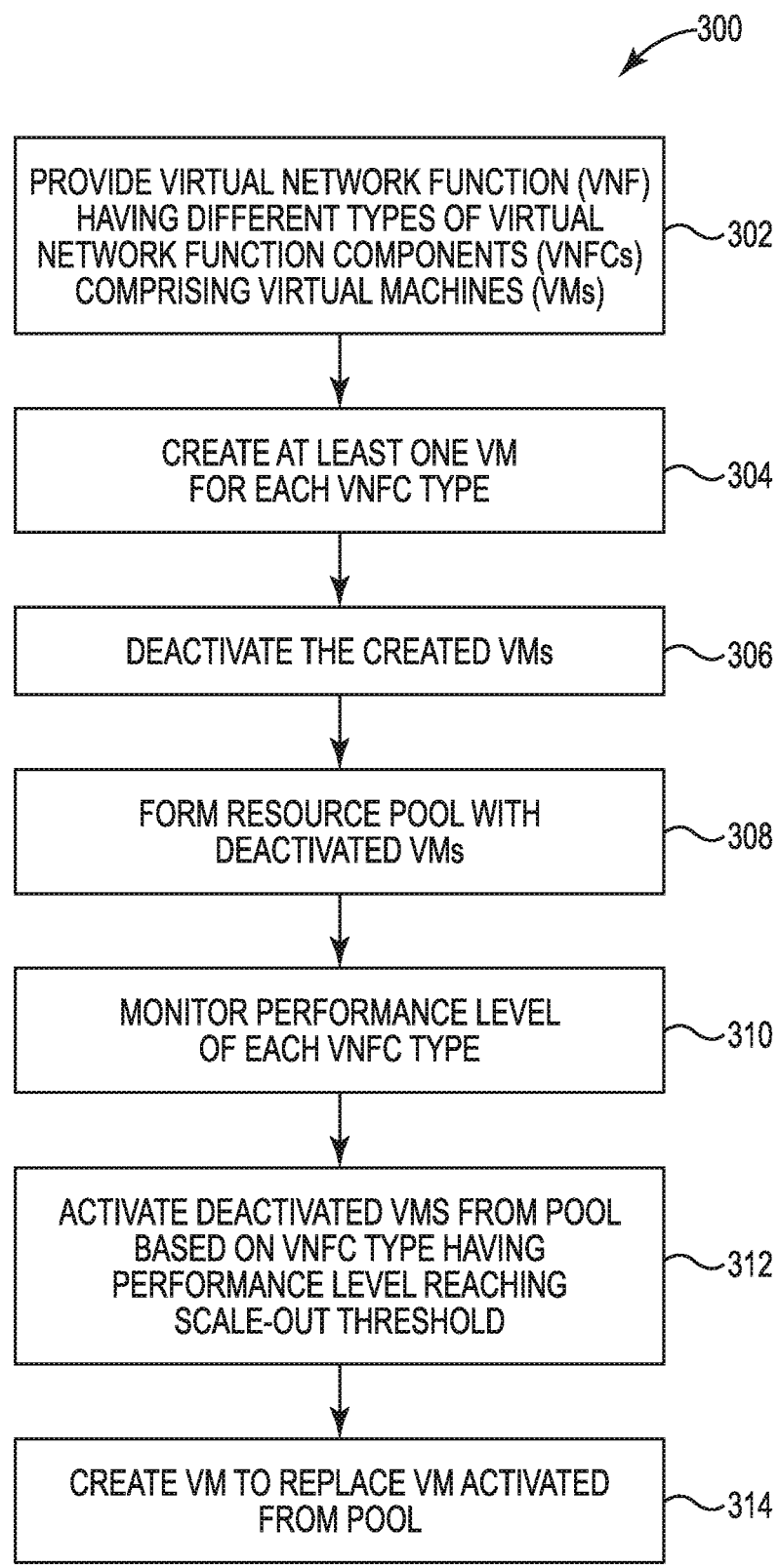
FIG. 4 is a flow diagram illustrating an example of a method of managing virtual network functions with deactivated virtual machines.

FIG. 4 is a flow diagram illustrating one example of a method 300 for managing virtual network functions in accordance with the present disclosure. Method 300 begins at 302 where a VNF including a number of VNFCs of a number of VNFC types is provided, each VNFC comprising a VM executing application software. At 304, least one VM is created for each VNFC type.

At 306, the VMs created for each VNFC type are deactivated by either stopping or hibernating the VMs, and at 307, the deactivated VMs are placed in persistent storage to form a pool of deactivated VMs for the VNF.

At 310, method 300 monitors at least one performance level of each VNFC type, such as by monitoring each VM of the VNFC type.

At 312, when the at least one performance level of any one of the VNFC types reaches a scale-out threshold, method 300 activates at least one deactivated VM of the VNFC type from resource pool 274 to scale-out the VNFC type and, thus, scale-out the VNF.

At 314, method 300 includes creating a new VM of the VNFC type loaded with application software. At 316, the newly created VM is hibernated or stopped and is placed in the resource pool to maintain the VM capacity level of the VNFC type at the desired VM capacity level. In one example, each time a VM is activated and removed from the pool, a new VM of the same VNFC type is created to keep the number VMs for each VNFC or layer at a desired level.

Figure 5:
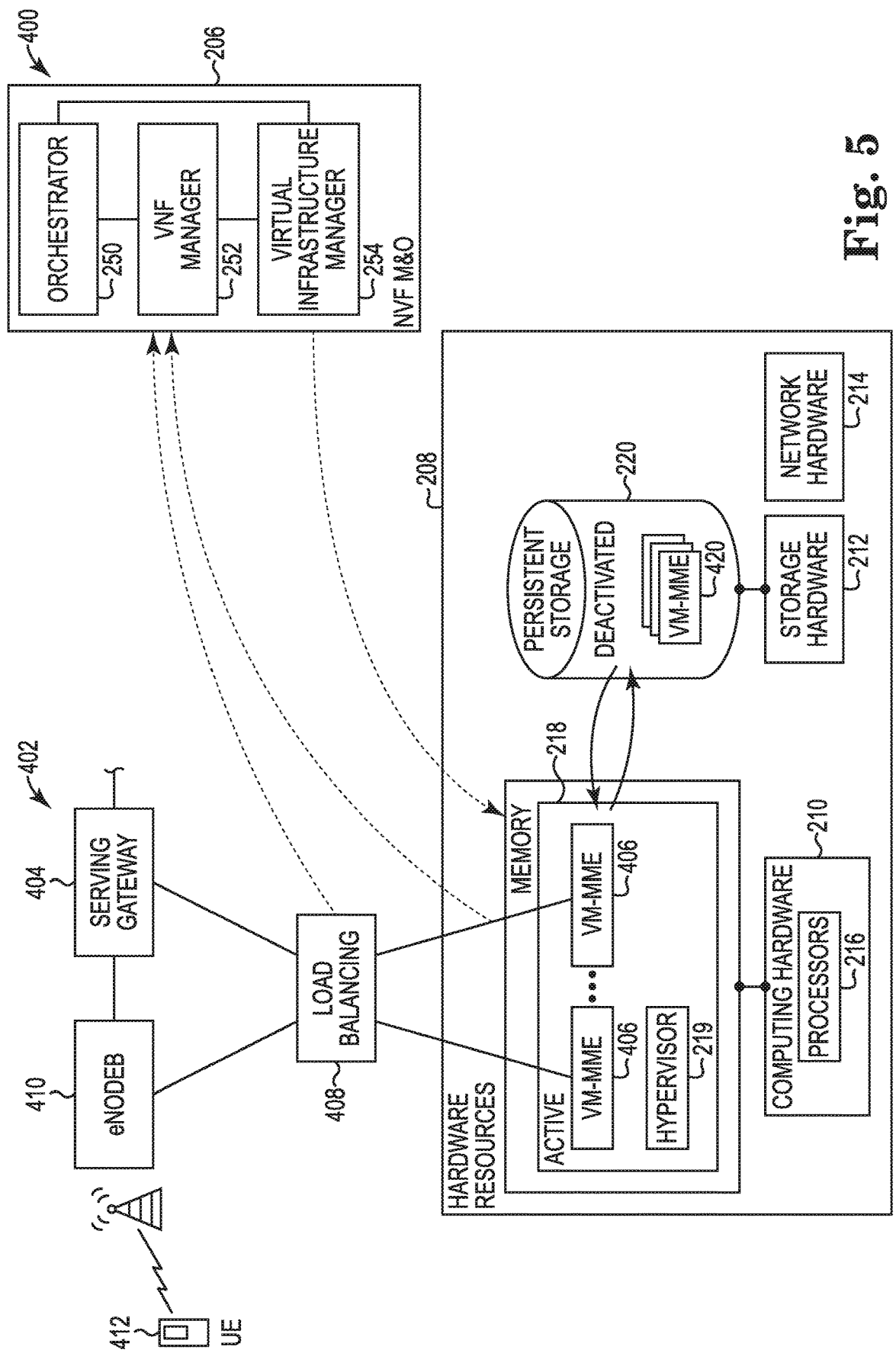
FIG. 5 is schematic block diagram generally illustrating portions of a telecommunications network including an evolved packet core architecture in which examples of the present disclosure can be implemented.

FIG. 5 is a schematic block diagram generally illustrating portions of an example of a wireless telecommunications network 400 including portions of an evolved packet core 402 in which examples of VNF management using deactivated VMs according the present disclosure can be implemented. Telecommunications network 400 includes an eNodeB 410, which is hardware that is connected to a mobile phone network, such as telecommunications network 400, that communicates directly with a user device or entity 412, such as a mobile handset, for example.

Evolved packet core 402 includes a serving gateway 404, which in this case is illustrated as a physical hardware appliance, and a mobility management entity (MME), which according to the illustrated example is implemented as VNF operating on a plurality of virtual machines VM-MME, as illustrated at 406, with the VM-MMEs 406 being hosted on standard computer resources 208. Standard computer resources 208 may comprise standardized, high-volume hardware components, such as blade-type servers, for example, and may be disposed at any number of locations on network 400. According to one example, computer resources 208 are located in a data center, for example, geographically disposed somewhere on telecommunication network 400, and is connected to the network via a load balancer Similar components of the NFV architecture described and illustrated by FIG. 3 are indicated in FIG. 5 using the same reference numbers as used in FIG. 3. In one example, NFV M&O component 206 can be hosted on computer resources 208, or can be hosted on remote hardware (not illustrated), such as in an operations center, for example. Wherever NVF M&O 206 is hosted, it is in communication with components of the network 400, including load balancer 408 and computer resources 208.

The serving gateway 404 is the gateway which terminates an interface of the network toward E-UTRAN (e.g. eNodeB, mobile device). The serving gateway 404 is also responsible for handovers with neighboring eNodeB's, and for data transfer in terms of all packets across a user plane.

An MME is a control node of the Evolved Pack Core (EPC) 402, and provides mobility session management for the LTE network and supports subscriber authentication, roaming and handovers to other networks, for example. As mentioned above, in the illustrated example of FIG. 5, the MME is virtualized as a VNF comprising multiple VMs, indicated as VM-MME at 406 executing application software.

In one example, NFV Orchestrator 250, via VIM 254, instructs Hypervisor 219 to create VM-MMEs for supporting the virtualized MME, to deactivate the created VMs by stopping and/or hibernating the VM-MMEs, and to place the deactivated VM-MMEs in persistent storage 220 to form a pool of deactivated VM-MMEs 420.

At least one performance level of VM-MMEs is monitored. In one example, when the at least one level of the VM-MMEs 406 reaches a scale-out threshold level, NFV Orchestrator 250 instructs hypervisor 219 to activate at least one deactivated VM-MME from the pool of deactivated VM-MMEs 420. The now activated VM-MME 406 is moved from persistent storage 220 to memory 218, and is connected to the network and registered with other network components and the VNF manager 252 coordinating and monitoring the MME VNF.

In one example, after removing the formerly hibernated VM-MME from persistent storage 220, hypervisor 219 is instructed to create a new VM-MME to replace the now-activated VM-MME in the pool of hibernated VM-MMEs.

As described above, active VM-MMEs 406 can also be deactivated, destroyed, or hibernated and moved to the pool of hibernated VM-MMEs in persistent storage when the at least one parameter of any one of the VNFC types drops below a certain threshold level (indicating that there is unused VNF capacity).

Similar to that described above, the activating and deactivating of VM-MMEs can be performed either manually by a network operator, or performed automatically by NFV Orchestrator 250.

Although illustrated and described with regard to an MME function, NFV is applicable to any data plane packet processing and control plane function in mobile and fixed networks, including serving gateway 404, and load balancer 408, for example, and a multitude of other network functions such as switching elements: BNG, CG-NAT, and routers; mobile network nodes: HLR/HHs, SGSN, GGSN/PDN-GW, RNC, Node B, and eNodeB; functions in home routers and set top boxes to create virtualized home environments; tunneling gateway elements: IPSec/SSL and VPN gateways; traffic analysis: DPI and QoE measurements; Service Assurance, SLA monitoring, Test and Diagnostics; NGN signaling: SBCs, IMS; converged and network-wide functions: AAA servers, policy control and charging platforms; Application-level optimization: CDNs, Cache Servers, Load Balancers, Application Accelerators; and security functions: firewalls, virus scanners, intrusion detection systems, and spam protection.

Figure 6:
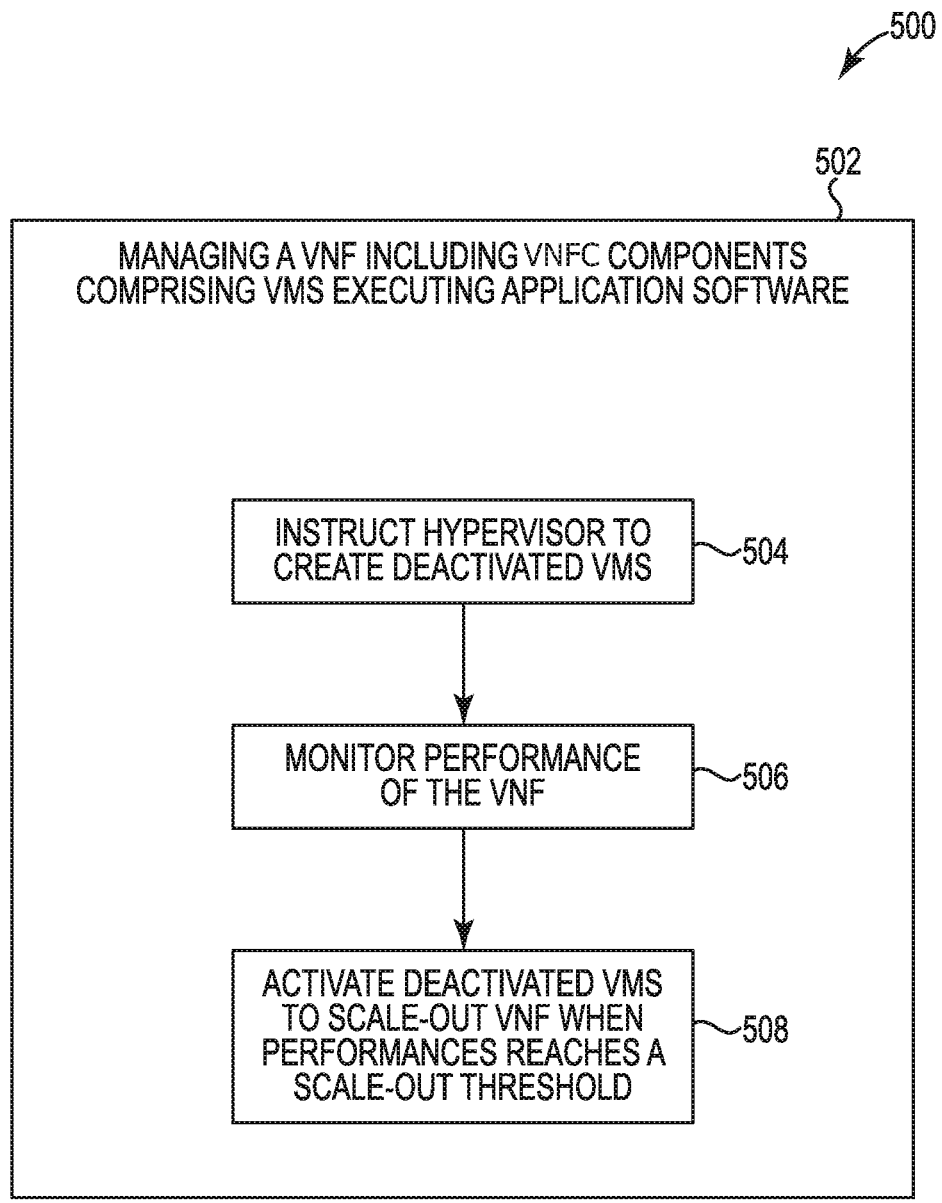
FIG. 6 is a diagram generally illustrating an example of a method of managing virtual network functions with deactivated virtual machines.

FIG. 6 is a diagram illustrating an example of a method 500 of managing virtual network functions performed via a processor executing computer executable instructions stored in a computer readable storage medium. As indicated at 502, method 500 includes managing a VNF including a number of VNFCs of a number of different types, each VNFC comprising a VM executing application software. The managing includes, as indicated at 504, instructing a hypervisor to create for each VNFC type a number of deactivated VMs with application software, the deactivated VMs comprising stopped and/or hibernated VMs. The managing further includes, as indicated at 506, monitoring at least one performance level of the VNF, and at 508, instructing the hypervisor to scale-out the VNF by activating a number of deactivated VMS of a number of VNFC types when the at least one performance level reaches a scale-out threshold.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A method of managing virtual network functions of a network, the method comprising:
providing a virtual network function (VNF) including a number of VNF components (VNFCs) of a number of different types, each VNFC type comprising a virtual machine (VM) executing application software associated with the type of VNFC;
pre-creating for up to all VNFC types a number of VMs having the application software associated with the type of VNFC;
deactivating the pre-created number of VMs by hibernating or stopping the pre-created VMs such that they are turned off and have a state stored in a persistent storage;
monitoring at least one performance level of the VNF;
scaling-out the VNF by activating a number of the deactivated VMs of a number of VNFC types when the at least one performance level reaches a scale-out threshold; and
scaling-in the VNF by deactivating a number of active VMs of a number of VNFC types, wherein the at least one performance level comprises a measurement of a performance level of the VNF, wherein the performance level of the VNF has a maximum value attainable for a given number of VMs of a given number of VNFC types that together form the VNF, and wherein the scale-out and scale-in thresholds are based on the maximum value, with the scale-out and scale-in thresholds changing when the VNF is scaled-out and scaled-in.

2. The method of claim 1, wherein the deactivated VMs of each VNFC type form a resource pool, wherein the resource pool includes a desired VM capacity level for each VNFC type in the resource pool, and wherein the desired VM capacity level can be different for each VNFC type, the method further including: in response to activating upon activation of a VM of a VNFC type from the resource pool, if the VM capacity level is below the desired VM capacity level, creating a deactivated VM of the VNFC type, and adding the deactivated VM to the resource pool to maintain the VM capacity level of the VNFC type at the desired VM capacity level; and in response to deactivating upon deactivation of a VM of a VNFC type, if the VM capacity level is below the desired VM capacity level, adding the deactivated VM to the resource pool.

3. The method of claim 2, including: in response to deactivating the VM of the VNFC type, if the VM capacity level is at least at the desired VM capacity level, deleting the deactivated VM if the VM capacity level is at least at the desired VM capacity level.

4. The method of claim 2, wherein for each VNFC type, if a VM of the VNFC type is in a process of being created to maintain the VM capacity level of the VNFC type at the desired VM capacity level while a VM of the VNFC type is in a process of being deactivated, the method including: terminating the process of creating the VM of the VNFC type; or completing the process of creating the VM of the VNFC type and adding the created VM of the VNFC type to the resource pool, completing the process of deactivating the VM of the VNFC type and adding the deactivated VM of the VNFC type to the resource pool, and deleting one VM of the VNFC type from the resource pool.

5. The method of claim 2, wherein upon the at least one performance level reaching the scale-out threshold, if the resource pool does not include a deactivated VM for any of the VNFC types to be activated to scale-out the VNF, the method including: creating a number of VMs for each of the VNFC types for which the resource pool does not include a deactivated VM; and activating the created VMs for each of the VNFC types for which the resource pool does not include a deactivated VM in lieu of first deactivating the created VMs and adding the deactivated VMs to the resource pool.

6. The method of claim 1, wherein scaling-out and scaling-in of the VNF is done manually by a network operator or automatically.

7. The method of claim 1, wherein the VNF includes a number of layers, each layer providing different functionality to the VNF, wherein each VNFC type corresponds to a different layer, wherein monitoring at least one performance level of the VNF includes monitoring at least one performance level of each layer, and wherein scaling-out the VNF includes: for each layer, scaling-out the layer by activating from the resource pool a number of VMs of the VNFC type corresponding to the layer when the performance level of the layer reaches a scale-out threshold.

8. The method of claim 7, further including scaling-in the VNF by deactivating a number of active VMs of a number of VNFC types when the at least one performance level reaches scale-in threshold, wherein scaling-in the VNF includes: for each layer, scaling-in the role by deactivating a number of VMs of the VNFC type corresponding to the layer when the performance level of the layer reaches a scale-in threshold.

9. The method of claim 1, wherein the deactivated VMs are hibernating VMs, and wherein activating each of the number of the deactivated VMs comprises restoring the state of the VM from the persistent storage restarting the hibernating VMs.

10. The method of claim 1, wherein the deactivated VMs are stopped VMs, and wherein activating the number of the deactivated VMs comprises restarting the stopped VMs.

11. The method of claim 1, further comprising: scaling-in the VNF by deactivating a number of active VMs of a number of VNFC types when the at least one performance level reaches a scale-in threshold, wherein scaling-in the VNF comprises hibernating or stopping the number of active VMs such that they are turned off; and registering the deactivation such that components of the network are notified that the deactivated VMs are no longer available to the network.

12. The method of claim 1, further comprising: registering the activation of each the number of the VMs by a VNF manager such that components of the network are notified that a number of newly activated VMs having a VNFC type are available to the network.

13. The method of claim 1, wherein the at least one performance level of the VNF includes one of a processing rated of the VNF, the number of simultaneous transactions, connections throughputs, and package throughputs.

14. A virtual network function (VNF) management system comprising:
memory to store computer executable instructions; and
a processor to access the memory and execute the computer executable instructions to:
provide a virtual network function (VNF) including a number of VNF components (VNFCs) of a number of different types, each VNFC type comprising a virtual machine (VM) executing application software associated with the type of VNFC;
pre-create for up to all VNFC types a number of VMs with the application software associated with the type of VNFC;

deactivate the pre-created number of VMs by hibernating or stopping the created VMs such that they are turned off and have a state stored in a persistent storage;

monitor at least one performance level of the VNF;

scale-out the VNF by activating a number of the deactivated VMs of a number of VNFC types when the at least one performance level reaches a scale-out threshold; and scaling-in the VNF by deactivating a number of active VMs of a number of VNFC types, wherein the at least one performance level comprises a measurement of a performance level of the VNF, wherein the performance level of the VNF has a maximum value attainable for a given number of VMs of a given number of VNFC types that together form the VNF, and wherein the scale-out and scale-in thresholds are based on the maximum value, with the scale-out and scale-in thresholds changing when the VNF is scaled-out and scaled-in.

15. The virtual network function (VNF) management system of claim 14, the processor executing the computer executable instructions to: scale-in the VNF by deactivating a number of active VMs of a number of number of VNFC types when the at least one performance level reaches a scale-in threshold, wherein deactivating includes stopping or hibernating a VM; and wherein the scale-in threshold is less than the scale-out threshold.

16. The virtual network function (VNF) management system of claim 15, wherein deactivated VMs of each VNFC type form a resource pool, wherein the resource pool includes a desired VM capacity level for each VNFC type in the resource pool, and wherein the desired VM capacity level can be different for each VNFC type, the processor executing the computer executable instructions: in response to activating upon activation of a VM of a VNFC type from the resource pool, create a deactivated VM of the VNFC type, and adding the deactivated VM to the resource pool to maintain the VM capacity level of the VNFC type at the desired VM capacity level; and in response to deactivating upon deactivation of a VM of a VNFC type, add the deactivated VM to the resource pool.

17. The virtual network function (VNF) management system of claim 14, wherein the VNF includes a number of layers, each layer providing different functionality to the VNF, wherein each VNFC type corresponds to a different layer, wherein monitoring at least one performance level of the VNF includes monitoring at least one performance level of each layer, wherein for scaling-out the VNF, the processor executing the computer executable instructions to for each layer, scale-out the layer by activating from the resource pool a number of VMs of the VNFC type corresponding to the layer when the performance level of the layer reaches a scale-out threshold.

18. The method of claim 14, wherein the state stored in a persistent storage comprises a run-time image of the created VMs.

19. A non-transitory computer readable storage medium storing computer executable instructions for controlling computer resources to perform a method of managing virtual network functions (VNFs), the method comprising:

managing a virtual network function (VNF) including a number of VNF components (VNFCs) of a number of different types, each VNFC type comprising a virtual machine (VM) executing application software associated with the type of VNFC, the managing comprising:

instructing a hypervisor to pre-create for each VNFC type a number of VMs with the application software associated with the type of VNFC;

deactivating the pre-created VMs by hibernating the created VMs such that they are turned off and have a state stored in a persistent storage;

registering the deactivation of the VMs;

monitoring at least one performance level of the VNF;

instructing the hypervisor to scale-out the VNF by activating a number of the deactivated VMs by restarting a number of the hibernating VMs of a number of VNFC types when the at least one performance level reaches a scale-out threshold;

registering the activation of each the number of the VMs by a VNF manager such that components of a network are notified that a number of newly activated VMs having a VNFC type are available to the network; and scaling-in the VNF by deactivating a number of active VMs of a number of VNFC types, wherein the at least one performance level comprises a measurement of a performance level of the VNF, wherein the performance level of the VNF has a maximum value attainable for a given number of VMs of a given number of VNFC types that together form the VNF, and wherein the scale-out and scale-in thresholds are based on the maximum value, with the scale-out and scale-in thresholds changing when the VNF is scaled-out and scaled-in.

20. The method of claim 19, wherein the hypervisor creates the number of VMs using an image file stored on the persistent storage.

* * * * *